United States Patent [19]

Dodgen

[11] Patent Number: 4,569,554

[45] Date of Patent: Feb. 11, 1986

[54] VAN BODY STRUCTURE

[75] Inventor: John N. Dodgen, Fort Dodge, Iowa

[73] Assignee: Dodgen Industries, Inc., Humboldt, Iowa

[21] Appl. No.: 685,040

[22] Filed: Dec. 21, 1984

[51] Int. Cl.$^4$ .............................................. B60P 3/32
[52] U.S. Cl. .................... 296/156; 296/183; 296/39 A; 296/102; 29/401.1
[58] Field of Search ............... 296/156, 183, 185, 10, 296/39 A; 29/401.1

[56] References Cited

U.S. PATENT DOCUMENTS

| | | | |
|---|---|---|---|
| 2,848,274 | 8/1958 | Geisler et al. | 296/156 |
| 3,731,970 | 5/1973 | Frank et al. | 296/156 |
| 4,511,173 | 4/1985 | Wentzel | 296/156 |

Primary Examiner—Robert R. Song

Attorney, Agent, or Firm—Zarley, McKee, Thomte, Voorhees & Sease

[57] ABSTRACT

A vehicle having an elongated passenger compartment with a floor, a forward end, a rearward end, and opposite side walls terminating in an open top portion between the upper edges of the side walls is provided with an auxiliary canopy or topper unit so as to increase the vertical height within the passenger compartment and to increase the length of the passenger compartment. The canopy includes side wall portions, a roof portion and forward and rearward ends. The side wall portions of the canopy are secured at their lower edges to the approximate midpoint of the side walls of the vehicle to create a double wall portion with an air space therein. The canopy also includes a plurality of roll bars and at least one window therein.

9 Claims, 5 Drawing Figures

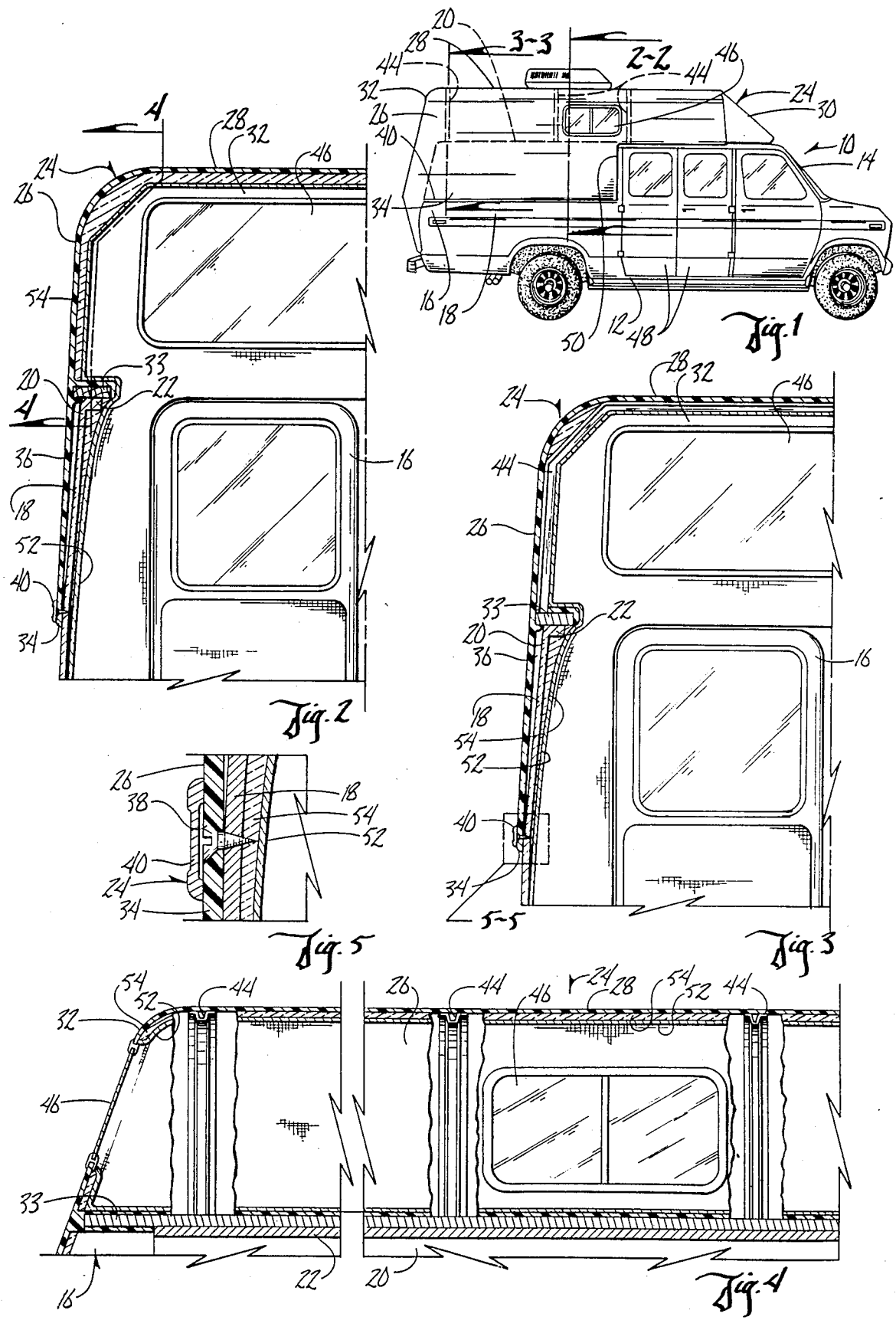

VAN BODY STRUCTURE

BACKGROUND OF THE INVENTION

Auxiliary canopies or topper units are well known for pick-up trucks, vans and other similar vehicles for increasing the room within the vehicle. Such conventional canopies are made of fiberglass or lightweight metal and are usually mounted on top of the vehicle so as to provide a single continuous side wall. However, the lightweight construction of conventional canopies does not insulate the interior of the vehicle from exterior sounds from various sources, including road noise and adverse weather conditions. Also, such single wall construction minimizes the thermal insulating ability for the interior of the vehicle.

Therefore, a primary objective of the present invention is the provision of an auxiliary canopy or topper unit for a vehicle which provides double wall construction for thermal and acoustic insulation.

Another objective of the present invention is the provision of an auxiliary canopy for a vehicle which is of lightweight construction.

Another objective of the present invention is the provision of a topper unit for a vehicle which increases the height and length of the passenger compartment therein.

Still a further objective of the present invention is the provision of an auxiliary canopy for a vehicle which provides easy access to the interior of the vehicle.

Another objective of the present invention is the provision of an auxiliary canopy for a vehicle having roll bars therein for structural stability and support.

Another objective of the present invention is the provision of an auxiliary canopy for a recreational vehicle having side wall portions overlappingly secured to the side walls of the vehicle so as to provide an insulation space between the overlapping walls.

A further objective of the present invention is the provision of an auxiliary canopy which is economical to manufacture, easy to attach to a vehicle, and durable in use.

SUMMARY OF THE INVENTION

A vehicle, such as a van, is provided with an auxiliary canopy or topper unit for increasing the height and the length of the passenger compartment within the vehicle. The vehicle includes a floor, a forward end, a rearward end, opposite side walls of substantially equal height, and an open top portion between the upper edges of the side walls. The canopy includes side wall portions, a roof portion and forward and rearward ends. The canopy is supported on the upper edges of the side walls of the vehicle. The side wall portions of the canopy are secured at their lower edges to the approximate midpoint of the side walls of the vehicle to create a double wall portion with an insulation space between the side wall portion of the canopy and the side walls of the vehicle. The side wall portions of the canopy extend upwardly from the upper edges of the side walls of the vehicle such that the roof portion of the canopy is at a height substantially above the upper edges of the side walls of the vehicle, thereby increasing the vertical height within the passenger compartment. The rearward end of the canopy extends rearwardly of the side walls of the vehicle so as to increase the length of the passenger compartment.

The canopy also includes inverted U-shaped roll bars for structural stability. Windows are provided in the canopy at an elevation above the double wall portion. Recesses in the side wall portions of the canopy permit direct and easy access to the doors in the side walls of the vehicle.

BRIEF DESCRIPTION OF THE DRAWINGS

FIG. 1 is a side elevational view of a vehicle having the auxiliary canopy of the present invention.

FIG. 2 is a partial sectional elevational view taken along lines 2—2 of FIG. 1.

FIG. 3 is a partial sectional elevational view taken along lines 3—3 of FIG. 1.

FIG. 4 is a partial sectional elevational view taken along lines 4—4 of FIG. 2.

FIG. 5 is an enlarged view taken along lines 5—5 of FIG. 3.

DETAILED DESCRIPTION OF THE DRAWINGS

In the drawings, reference numeral 10 generally designates a vehicle having an elongated passenger compartment defined by a floor 12, a forward end 14, a rearward end 16, and opposite side walls 18. Side walls 18 are of substantially equal height and terminate in an open top portion between the upper edges 20 thereof. Upper edges 20 extend along the substantial length of vehicle 10 and may include an inwardly extending support flange 22, as best seen in FIGS. 2 and 3.

An auxiliary canopy or topper unit is generally designated by the reference numeral 24. Canopy 24 includes side wall portions 26, a roof portion 28, a forward end 30, and a rearward end 32. Side wall portions 26 of canopy 24 include an inwardly extending support member 33 which is mounted on support flange 22 at upper edge 20 of side walls 18, thereby supporting the bulk of the weight of canopy 24.

Side wall portions 26 have a lower edge 34 which is secured to the approximate midpoint of side walls 18 of vehicle 10. Side wall portions 26 extend upwardly with respect to side walls 18 and together, create a double wall portion with a space 36 therebetween, as seen in FIGS. 2 and 3. Thus, side wall portions 26 extend upwardly from the upper edges 20 of side walls 18 of vehicle 10 so that roof portion 28 of canopy 24 is at an elevation substantially above the upper edges 20 of side walls 18, thereby increasing the vertical height within the passenger compartment of the vehicle.

Lower edge 34 of side wall portion 26 is preferably secured to the approximate midpoint of side walls 18 by a plurality of sheet metal screws 38 which are then covered by decorative trim or molding 40. It is understood that other convenient means may be employed to secure lower edge 34 of side wall portions 26 to side walls 18 without departing from the scope of the present invention.

Canopy 24 also includes a plurality of inverted Ushaped roll bars 44 secured to side wall portions 26 and roof portion 28 thereof. Roll bars 44 provide structural stability for canopy 24.

Canopy 24 further includes at least one window 46 positioned above upper edge 20 of side walls 18 of vehicle 10. The drawings show a window 46 in side wall portion 26 as well as in rearward end 32. A similar window may also be included in forward end 30, if so desired.

Vehicle 10 includes side doors 48 for access to the passenger compartment, as is conventional in vans and recreational vehicles. As seen in FIG. 1, side wall portion 26 of canopy 24 has a recessed portion 50 which permits direct access to side doors 48.

The passenger compartment of vehicle 10 may be lined with carpeting or other suitable material 52. Insulation 54 may be placed between lining material 52 and side walls 18 or side wall portions 26. Such insulation, along with dead air space 36, provides thermal and acoustic insulation to the passenger compartment. Appropriate weather stripping material (not shown) may be provided to seal the passenger compartment from the elements of nature.

Thus, canopy 24 provides a raised roof on vehicle 10 for a more comfortable passenger compartment. Also, rearward end 32 of canopy 24 extends beyond rearward end 16 of vehicle 10 to increase the length of the passenger compartment, as depicted in FIG. 1.

Therefore, the canopy and vehicle combination of the present invention satisfies at least all of the stated objectives.

What is claimed is:

1. In combination with a vehicle having an elongated passenger compartment with a floor, a forward end, a rearward end, opposite side walls of substantially equal height, and an open top portion between the upper edges of said side walls, an auxiliary canopy on said vehicle, said canopy comprising side wall portions, a roof portion, and forward and rearward ends, said side wall portions being secured at their lower edges to the substantial midpoint of said side walls of said vehicle and extending upwardly with respect to said side walls to create a double wall portion, said side wall portions extending upwardly from the upper edges of said side walls of said vehicle and terminating in said roof portion at an elevation substantially above the upper edges of said side walls to create an increased vertical height in said passenger compartment.

2. The combination of claim 1 wherein said side wall portions are also secured to the upper edges of said side walls of said vehicle.

3. The combination of claim 1 wherein passenger access openings are formed in at least one of said side walls of said vehicle, and said side wall portions have recesses therein to permit direct access to said access openings.

4. The combination of claim 1 wherein the rearward end of said canopy extends rearwardly of said side walls of said vehicle to increase the length of said passenger compartment.

5. The combination of claim 1 wherein a plurality of inverted U-shaped roll bars are secured to said side wall portions and said roof portion.

6. The combination of claim 1 wherein a space exists between said side wall portions and said side wall of said vehicle above the lower edges of said side wall portions.

7. The combination of claim 1 wherein said auxiliary canopy further includes at least one window at an elevation above said double wall portion.

8. The combination of claim 1 wherein said side wall portions include a support surface for supporting said canopy on the upper edges of said side walls of said vehicle.

9. The combination of claim 1 wherein said vehicle includes an inner lining and insulative material between said inner lining and said canopy.

* * * * *